March 1, 1955

A. WINKLE 2,703,114

COPYING MACHINE

Filed Nov. 16, 1949

INVENTOR
ADOLF WINKLE
By E.J. Freeman
ATTY.

March 1, 1955     A. WINKLE     2,703,114
COPYING MACHINE

Filed Nov. 16, 1949     4 Sheets-Sheet 3

INVENTOR
ADOLF WINKLE
By
ATTY.

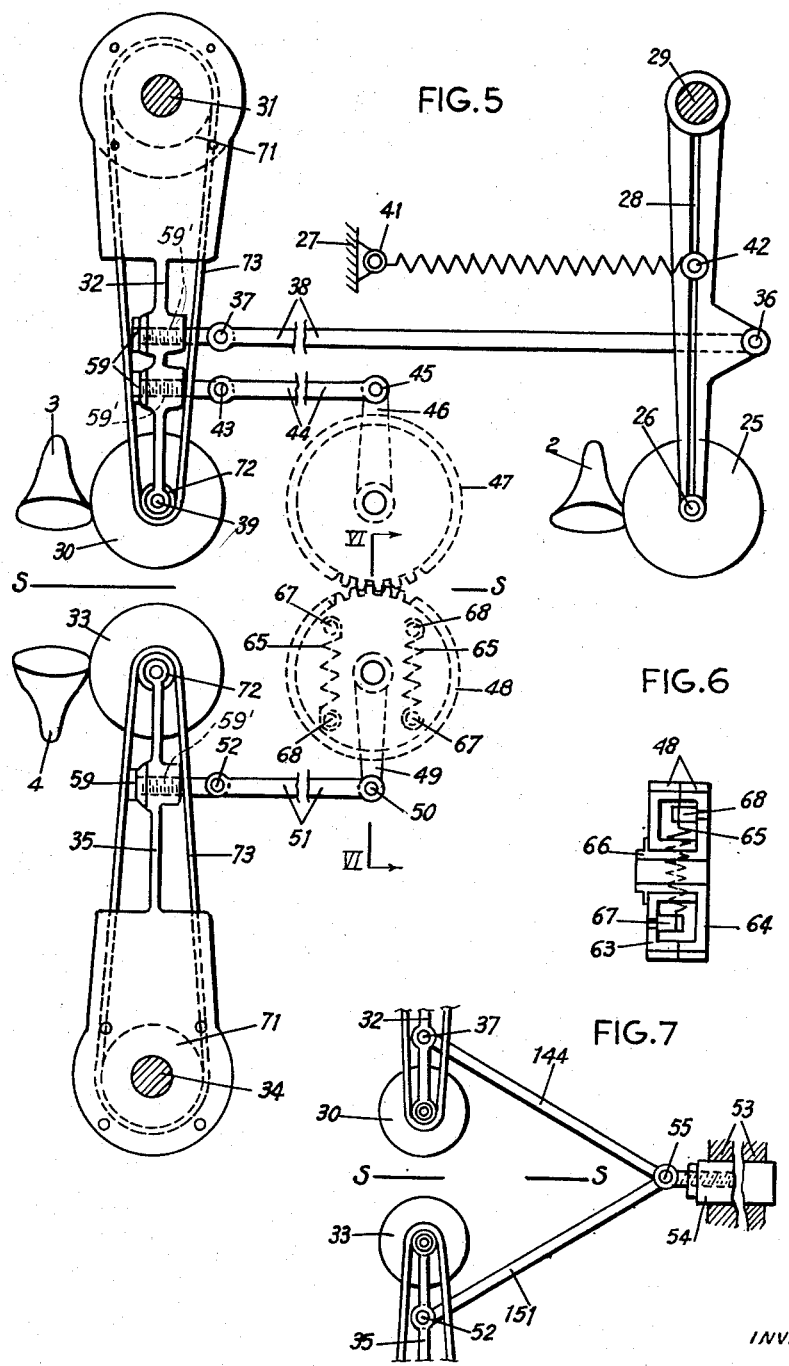

2,703,114

COPYING MACHINE

Adolf Winkle, Milan, Italy, assignor to Incoma S. p. A., Milan, Italy

Application November 16, 1949, Serial No. 127,552

Claims priority, application Italy March 18, 1949

3 Claims. (Cl. 142—15)

This invention relates to copying machines for the manufacture by means of templets or models oppositely handed parts, each of which corresponds to the image of the other as reflected by a mirror.

The machine enables the manufacture by means of one templet of two parts having a strictly specular likeness, as shoe lasts or heels for the left and right foot, respectively, manufacture of the two parts being carried out successively or conveniently simultaneously.

I understand as specularly equal in the broadest sense also parts equal to each other. In this case, the possibility of manufacturing with exact likeness two such parts simultaneously by means of one templet and in one step affords a great economy.

Manifold machines of various types for carrying out work of this type are known. They always include in every case a rotating templet of which the rotation is transmitted to the work-piece or work-pieces, means being provided for imparting to the blanks to be worked successively a rotation in different directions with respect to the templet or for imparting to two blanks to be worked a simultaneously opposite rotation. Means are provided in every case for an approach to the axis of rotation of the work and for the withdrawal therefrom the tool or tools according to the radial projection of the templet which on rotation of the latter successively actuate a tracer for generating the shape of the work according to polar coordinates.

In a machine of this type which serves for the simultaneous working of two blanks, the tracer and the tools are mounted on a carriage performing a straight-line motion, which has a sufficient length and weight for ensuring an accurate guide. The machine confers to the two work profiles which accurately match each other. On account of the friction along the long guides of the carriage and the considerable mass of the latter, the machine has a high inertia and production is unsatisfactory with regard to quality.

Moreover, it requires a considerable power for moving the carriage which, if no appreciable differences in projection are to be overcome temporarily, affects the templet causing a rapid wear and tear of the latter and, frequently, of the tracer too. Consequently, a constantly accurate reproduction of the profile of the templet on the workpieces cannot be relied upon.

With another known machine, the tracer and the tool or tools are mounted on one or two frames which, by means of lemniscate guides arranged at both ends, are moved practically in a straight-line direction towards the axis of rotation of the tracer and of the work in opposite directions. Since a leverage merely affords an approximation to the straight-line, this machine fundamentally does not operate as accurately as the before referred to machine. In the last-mentioned machine the frames and leverages have heavy masses and even the construction for machining only one blank suffers from a considerable inertia causing the above-mentioned consequences. The elaborateness of a number of parts is per se a source of inaccuracy and the numerous bearings and their unavoidable wear cause inaccuracies to occur very soon at an increasing rate.

Attempts have been made to eliminate these drawbacks in another known machine by location of both the tracer and the tools on swing arms connected by links in order to perform an angularly equal movement. By this arrangement, the moving masses could be somewhat reduced, thereby improving the output of the machine and simplifying its construction. This type of machine, however, does not afford a specular similarity of the shapes of both work-pieces, because the movement of the tools in a constantly equal direction to each other which tools are moved along an arc in the direction of the height of the camber of the arc is superposed to opposed rotational movements of the works. By juxtaposing two works obtained as above in the direction of the height in the same sense, for instance by placing a left-hand last and a right-hand last individually on the sole, it will be ascertained that the height of the camber of the movement of oscillation of the tool has affected them upwardly and downwardly, respectively. This error becomes greater as the swing arms of the tools are shorter. In order to reduce this error to some extent, the known machine must have very long swing arms, which again causes heavy masses and a considerable inertia and inherent drawbacks. Moreover, in all known machines inertia objectionably affects the surface quality of the work-pieces.

This invention avoids the above-mentioned inconveniences without impairing useful properties and by utilising the possibilities afforded by the principle, on which the invention is based, improves accuracy, surface quality and output.

According to this invention, in a copying machine, in which the tracer and tools are mounted on swing arms and in which the swinging movement of the tracer arm actuated by a rotary template is transmitted to the tool arms and the two work pieces rotate in opposite directions in synchronism with the template, the two operating groups, each comprising a work piece and a swing arm provided with a tool, constitute a specular image of each other, and means are provided for transforming the swinging movements of the tracer controlled tool arm into a specularly equal movement of the other tool arm.

In this manner on the two work-pieces an exactly equal profile is produced by the use of swing arms for guiding the tracer and tools, that is, with the possibility of employing small masses and a simple construction, not subject to wear, with the result of an increased output and durable accuracy. Under the aspect of accuracy, the machine is not affected by the length of the swing arms which, in order to take care of other constructional requirements, may be as short as desired, whereby the moving masses may be further reduced. The power required for moving the swing arms is thereby considerably reduced and damage of the templet is eliminated so that even if the latter be made of wood it maintains its shape thereby contributing to a durable accuracy. The surface quality of finished work-pieces is particularly satisfactory. The mechanism for connecting the two tool swing arms may be of any desired type and left to the choice of the constructor.

According to a preferred embodiment, the mechanism may consist of two toothed wheels or segments which mesh together in the plane of symmetry of the tool swing arms, and are equal in diameter to the pitch circle, two levers equal in length oscillated by the toothed wheels or segments, and two operating rods for the tool swing arms, which connect the free ends of the rods to the two tool swing arms symmetrically to their axis of symmetry.

A mechanism of this kind works practically without friction.

According to another embodiment of the invention, the mechanism may consist of carriages guided along a straight line in the plane of symmetry of the tool swing arms and operating rods extending from points of articulation situated on the carriage symmetrically with respect to said plane of symmetry toward control points symmetrically arranged with respect to said plane of symmetry on the tool swing arms. A control of this kind theoretically entails friction due to the carriage, but through the specularly equal distribution of force friction is very low, the masses to be moved are small and construction is greatly simplified.

In conformity with a further embodiment of this invention and in order to avoid lost motion in the transmission of rotational movement from the templet to the work-pieces in the rotational movement of the latter in opposite directions and in oscillation of the work swing arms, the transmission teeth may resiliently mesh under a resilient pressure exceeding the tool reaction pressure.

In a still further embodiment of the invention, the control of the tools is taken care of by electric motors arranged on the tool swing arms concentrically with their axis of oscillation, said motors swinging therewith. The arrangement of electric motors for controlling tools arranged on arms swinging concentrically with their axis of oscillation is known per se. However, the electric motors were fixedly mounted on the bedplate of the machine. On oscillation of the tool swing arms through the tool control cam the motors had a delaying or accelerating effect, depending upon the direction of oscillation. This drawback is avoided by the above-mentioned further embodiment of this invention, affording a quicker speed rate and a lower power consumption for moving the swing arms, the surface of the work-pieces being thereby improved in quality.

According to a further embodiment of the fundamental principle of this invention, the axes of oscillation of the tool swing arms may be vertically superimposed, so that one of the swing arms depends and the other is symmetrically thereto. In this manner, the weights of the tool swing arms with the parts carried thereby are balanced, which again promotes quickness of speed rate, reduction in power consumption and surface quality of the blanks.

The accompanying drawings show some constructions of the machine according to this invention.

Figure 5 is an elevation on a still further enlarged scale showing by way of example a connection of the tool swing arms for common movement, seen in the same direction as Figure 1; this figure further shows a rocker arm for the templet;

Figure 6 is a partial section on line VI to VI of Figure 5; and

Figure 7 is a partial view seen in the direction of Figure 1 and on an enlarged scale of a further construction of the connection of the tool swing arms for common movement.

Figure 1:
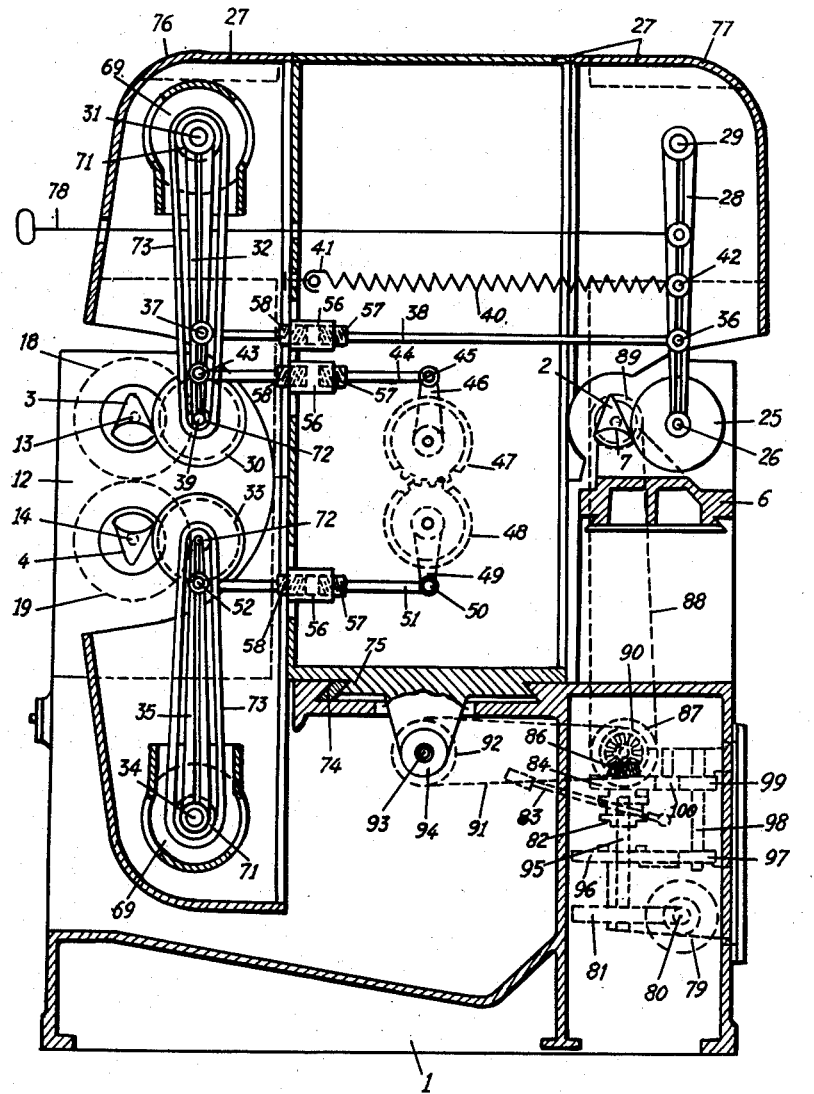
Figure 1 is a vertical section along the axis of rotation of the work-piece looking from the work clamping end, partly in section on line 1—1 of Fig. 2; the tracer and tools being at the lateral region of greater thickness of the templet and work-piece, respectively.

1 denotes the bedplate of the machine, 2 the template, 3—4 the work-pieces. The templet is rotated by a shaft 7 mounted on a pedestal bearing 6 and connected for rotation with the templet by the engagement of blades 5, said shaft being kept against longitudinal displacement during operation. 8 is the tailstock for the templet, mounted in a pedestal bearing 9.

The work-pieces 3 and 4 are mounted for rotation between shafts 13 and 14 and tailstocks 16, 17 mounted on a pedestal bearing 15. The shafts 13, 14 are provided with points 10, 11 engaging the work-pieces and may be displaced longitudinally during operation in a bearing 12. The work-pieces 3, 4 are connected for rotation at equal angular speed but in opposite directions, by means of the toothed wheels 18, 19, equal in size, which rotate with the shafts 13, 14.

In the construction shown, a cross shaft 20 is mounted in the bedplate 1 for operating the templet 2 and work-pieces 3, 4 for common rotation, and carries at its ends bevel wheels 21, 22. The bevel wheel 21 meshes with a bevel wheel 23 keyed on the templet shaft 7, and the bevel wheel 22 meshes with a bevel wheel 24 keyed on the work-piece shaft 13. Instead of the parts described and illustrated for connection of the work-pieces 3, 4 with the templet 2 for common rotation in opposite directions with respect to the work-pieces and at equal angular speed, other transmission members, such as sets of spur wheels, chain drives without lost motion, flexible or Cardan shafts and the like, which are well known in the art and are not therefore individually illustrated may be employed without departing from the scope of this invention.

25 denotes a tracer which slides on the templet 2 and is conveniently in the form of a small tracer roller easily slidable on the shaft 26. This roller is mounted for oscillation in a support 27 and is oscillated by a supporting arm 28 about an axis of oscillation 29. The tool 30 which machines the work-piece 3 is mounted on a swing arm 32 oscillating about the axis of a shaft 31; the tool 33 machining the blank 4 is mounted on a swing arm 35 which oscillates about the axis of a shaft 34. The shafts 31 and 34 are mounted in a support 27. The swing arms 28, 32 and 35 are of equal length from the geometrical axis of oscillation to the centers of the tools, and the tracer roller and tools are equal in shape of their operating surfaces. In the milling cutters used as tools the operating surfaces are the peripheral surfaces which envelop their cutting edges, that is, the rotation surfaces described by the cutting edges on rotation.

The swing arms 28, 32 are connected for common oscillation by a rod 38 articulated to the swing arm 28 at 36 and to the swing arm 32 at 37. Unless a graduation mechanism is provided for determining the shape of the profile of the work-pieces as explained hereafter, the arrangement is carried out in such manner that the shafts 26, 29, 31, 39 (axis of rotation of the tool 30) on one part and the shafts 36, 29, 31, 37 on the other part or, more exactly, the geometrical axes of said parts form parallelograms on each angular oscillation of the swing arm 28 seen in an axial direction. 40 denotes a device which constantly approaches the tracer 25 to the templet 2, for instance a tension spring applied to the support 27 at 41 and to the swing arm 28 at 42, or a hydraulic pneumatic or electromagnetic pressure mechanism or the like. Under the above described conditions of the swing arms 28 and 32, the profile of the work-piece 3 takes a form accurately matching the profile of the templet 2. If the above described conditions are changed, for instance by employing the cutting edge as a tracer instead of roller 25 matching by its peripheral surface the tool or a tracer roller smaller or greater than the tools, departure from the abovementioned parallelograms by means of a socalled graduating device, the form of the profile of the work-piece 3 varies from that of the templet 2 according to a determined law, hence in an easily controllable manner.

Transmission of the oscillating movement of the tracer swing arm 28 to the swing arm 35 of the tool 33 is effected through the swing arm 32 of the tool 30 of the machines illustrated by means of either of the following mechanisms.

In the construction shown by way of example in Figures 1 to 4, one end of a rod 44 is pivotally connected at 43 to the swing arm 32, and the other end of rod 44 is pivotally connected at 45 to a lever 46, fixed to and rotating with a toothed wheel 47.

A further toothed wheel 48 of which the pitch circle equals that of the toothed wheel 47, meshes with the latter in the plane of symmetry S—S of the angle formed by the swing arms 32 and 35. A lever 49 equalling in effective length the lever 46 and constantly at the same inclination to the plane S—S of the lever 46 is fixedly connected with the toothed wheel 48, a control rod 51 extends from an articulation 50 at the free end of the lever 49 to an articulation 52 on the swing arm 35.

The mechanisms 43 to 47 on one part and mechanisms 48 to 52 on the other part are situated symmetrically to one another with respect to the plane S—S and the effective lengths of the swing arms 32 and 35 between their pivots 31, 34, respectively and the axes of rotation of the tools 30, 33, respectively (considering always the geometrical axes) are equal to each other.

In this manner, assuming the absence of any lost motion in the whole mechanism, the form of the profile of the work-piece 4 becomes specularly equal to that of the work-piece 3. This accurate matching is obtained, whichever the length of the swing arms 28, 32 and 35 may be, that is, even with very short swing arms 28, 32 and 35 which are therefore of very low inertia. In consideration of this reduced length, said swing arms may be of small section, hence of light weight and low inertia. The toothed wheels 47, 48 are mounted in the frame 27.

In the construction shown in Figure 7, the toothed wheels 47, 48 and levers 46, 49 are replaced by the carriage 54 guided on a straight line in a guide 53 on a frame 27, said carriage moving in the direction of the plane S—S and having on the latter or symmetrically thereto the articulation axis 55 or the axes of articulation for the control rods 144 and 151 which are articulated symmetrically to the plane S—S at points of articulation 37, 52, respectively on the swing arms 32 and 35, respectively.

Transmission of the movement of oscillation from the swing arm 32 to the swing arm 35 is therefore correctly effected as in the construction shown in Figure 5.

For a highly accurate adjustment the rods 38, 44 and 51 may be provided with micrometric length adjustment as shown diagrammatically in Figure 1, by dividing the rods and connecting the rod sections by means of nuts 56 provided with inner oppositely pitched screw-threads or differential screw-threads. The nuts 56 move on cooperating screw threads 57, 58 on the ends of the rod sections. According to another construction the micrometric adjustment of the rod lengths may be effected by means of milled nuts 59 (Figure 5) engaging the adjustment screws 59' at the ends of the respective rods, that is, in a better accessible position.

Figure 4:
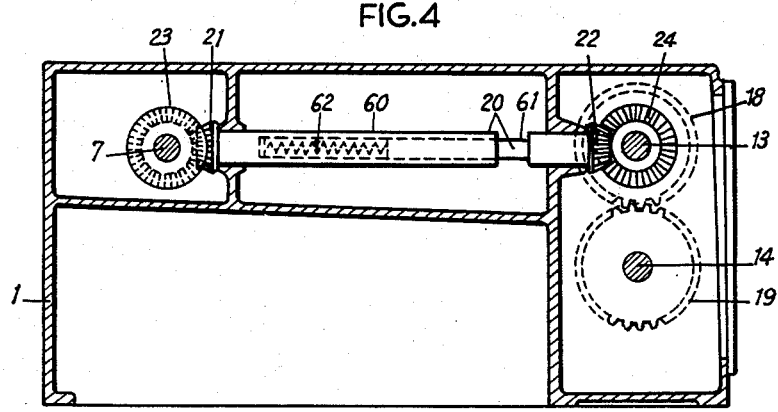
Figure 4 is a large scale sectional view taken on line IV—IV of Figure 2.

The absence of lost motion on the various toothed connections shown may be obtained in any suitable manner, for instance by means of a proper length adjustment of the bevel wheels 21 and 22 on the shaft 20 and arrangement of the toothed wheels 28, 19 and 47, 48 side by side, or of said toothed wheels and intermediate toothed wheels arranged by pairs therebetween. The absence of lost motion is constantly and automatically obtained, according to a further development of the abovementioned arrangements, by causing the sets of teeth to mesh resiliently under a resilient force exceeding the tool reaction. Thus, the shaft 20 may be made up of two parts 60, 61 telescopically slidable within each other, which may be withdrawn from each other and released by a spring 62 in such manner that the bevel wheels 21, 22 are constantly pressed into the bevel wheels 23, 24 as shown in Fig. 4. In spur wheel transmission this applies to spur wheel 18 (Figures 2 and 6) and spur wheel 48 (Figures 5 and 6). One of the wheels may be divided perpendicularly to its axis and between the half-wheels 63, 64 springs 65 may be interposed which tend to rotate the half-wheels 63—64 against each other constantly in the sense of an increase in thickness of the teeth. With this object in view, Figure 6 shows the arrangement of a cylindrical half-wheel 63 on the hollow pivot 66 of the other half-wheel 64, as well as of a suspension pivot 67 for each spring 65 on the half-wheel 63 and a suspension pivot 68 for the same spring on the half-wheel 64.

The swing arms 32, 35 may be arranged in any desired position. It is, however, fundamentally advantageous to arrange them with their pivots 31, 34 vertically superimposed and the plane of symmetry S—S located horizontally as shown in the drawing, in such manner that the swing arm 42 depends downward while the swing arm 35 is upright, and the swing arms 32 and 35 form together constantly equal angles to the plane S—S. The weights of the swing arms 32, 35 are thereby reciprocally balanced in any position of oscillation thereof. The tools 30, 33 may be operated in any desired manner, for instance by means of small electric motors coaxial therewith or of electric motors located on the frame 27 coaxially with the pivots 31, 34 and belt drive in the swing arms 32, 35 or the like. It is, however, particularly advantageous to adopt the arrangement shown, in which the electric control motors 69 are fixed in suitable sockets in the swing arms 32, 35 divided for assembly at 70 coaxially with the pivots 31, 34 in such manner as to oscillate with the swing arms 32, 35. Transmission of motion from the electric motors to tool swing arms may be effected in any desired manner, for instance by means of the pulleys 71, 72 carried by the swing arms 32, 35 and belts 73, through bevel wheels on the shafts of electric motors 69 and tools 30, 33 and an intermediate shaft carrying bevel wheels or through flexible shafts, the two latter embodiments not having been particularly illustrated, as they are obvious to those skilled in the art, or in any other desired manner.

Figure 2:
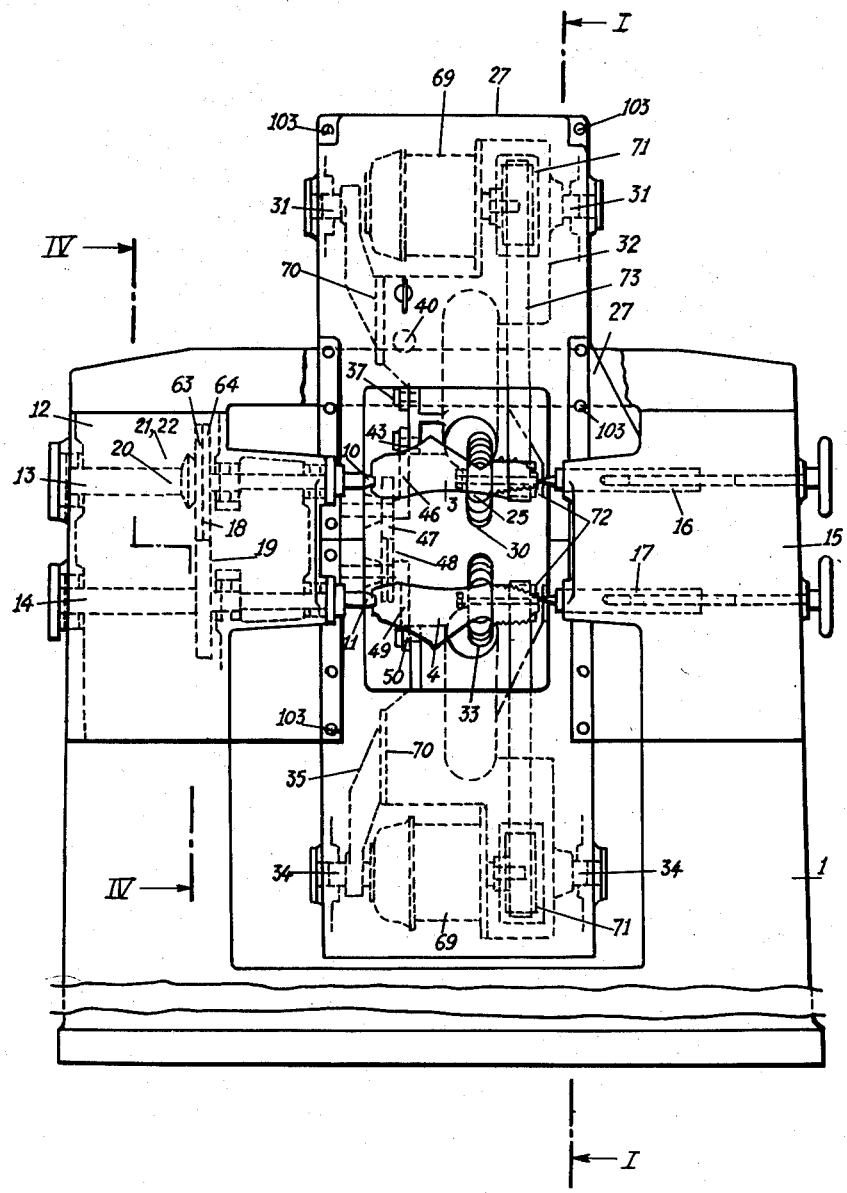
Figure 2 is an elevation seen from the left-hand side of Figure 1.
Figure 3:
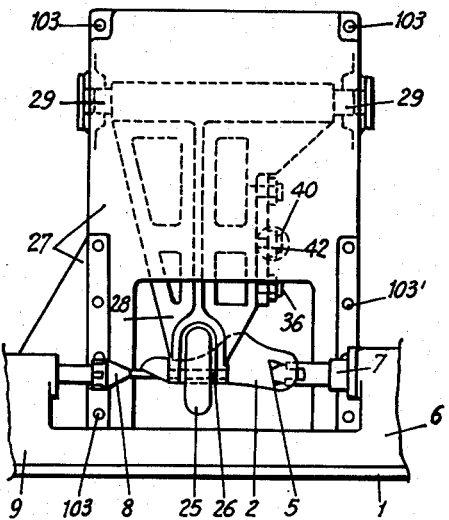
Figure 3 is a partial view of the same construction seen from the right-hand side of Figure 1.

In the construction shown, the frame 27 is displaceable in a carriage guide 74, 75 on the bedplate 1 of the machine toward the tool axes so that the roller 25 and tools 30, 33 may be displaced longitudinally with respect to the work-pieces 3, 4 which are capable of longitudinal displacement and work-pieces of any desired cross sections may be machined which may vary over the work length and may be of any desired shape, such as for instance the shoe lasts shown. Reciprocally it is possible to adopt stationary tracer 25 and tools 30, 33 by arranging them on the bedplate 1, and guide the templet 2 and work-pieces 3, 4 by means of the frame 27. This simple reverse arrangement will be readily carried out by those skilled in the art and is not specifically illustrated. The construction of the frame 27 shown on the drawing (see connecting screws 103 in Figures 2 and 3 provided in part only with the reference numerals and referred to merely by circles) and comprising a carriage member proper with a guide 75 and a basket 76 suspended in front is not merely intended to facilitate operation of the frame 27 or its parts in manufacture together with the basket member 77 provided in front, but also to facilitate machining of the sliding surfaces on the carriage guide 74.

The tracer 25 and tools 30, 33 may be lifted in any desired manner from the templet and work-pieces, for instance by acting by hand on one of the swing arms 32 or 35 by means of a lifting rod 78 diagrammatically shown in Figure 1. Alternately, an hydraulic electromagnetic or any other desired control may be employed.

Besides the above described controls, the machines according to this invention may be controlled in any other suitable manner. Simply by way of illustration under this aspect of only some complete machines, the drawing shows diagrammatically two controls. In the example shown in Figure 1, an electric motor 79 controls through a worm gear 80, 81 a coupling sleeve 82. When the latter is coupled as illustrated by means of the lever 83 or the like with the clutch member 84, arranged above, the clutch member 84 rotates the templet 2 by means of the bevel wheel 86 fixedly connected with the clutch member 84, the sprocket wheel 87 which rotates with the bevel wheel 86, the chain 88 and sprocket wheel 89 mounted on the templet driving shaft 7. I have described above methods of transmitting rotation of the templet to the work-pieces 3 and 4. If the tracer 25 and tools 30, 33 should perform a longitudinal movement also with respect to the templet 2 and work-pieces 3, 4, by means of a sprocket wheel 90 connected for rotation with a bevel wheel 86 it is possible to actuate through a chain 91 and a sprocket wheel 92 actuated by the former a spindle 93 mounted in the bedplate 1, which actuates the bearing 27 by means of a nut 94 provided on the bearing. The clutch shaft 95 may further have loosely mounted thereon a clutch member 96 having a toothed rim which, when the coupling sleeve 82 is clutched with 96, drives a toothed wheel 97 of a gearing 97, 98, 99, the last toothed wheel 99 of said gearing actuating through an intermediate wheel the clutch member 84 likewise provided with a cylindrical set of teeth, and the machine in a direction of rotation reversed with respect to the former and with a quick return stroke.

The machines according to this invention may be utilized both for milling, cutting and polishing.

Besides working wood or other materials easy to cut such as horn, artificial horn, synthetic resins and the like, they may be employed, by proper choice of the tools and rates of speed even for working any other material, such as light metals or other metals.

What I claim is:

1. In a copying machine, a rotary template, two work pieces rotatable in opposite directions in synchronism with said template, three parallel shafts and swing arms mounted on the same each for pivoting about the axis of its shaft, the first arm comprising a tracer following the outline of the template, each of the other two arms comprising a cutting tool and said two other arms extending from their pivot axes in substantially opposite directions to form a specular image of each other with respect to a plane of symmetry passing between the two work pieces, a group of swinging motion transmitting means positioned between said tracer arm and one of the two tool carrying swing arms, and a second group of swinging motion transmitting means interconnecting said two tool carrying arms and adapted to transform the swinging movement of the tracer controlled tool arm into a specularly equal movement of the other tool arm, said transmitting means comprising two gears of equal diameter and pitch meshing in the said plane of symmetry, two levers connected for pivotal movement with said gears, and two rods pivotally connected between said levers and said tool carrying arms.

2. In a copying machine, a rotary templet, means for rotating said templet, a first rotary workpiece support, means for driving said first rotary workpiece support in the same direction and at the same speed as said templet, a second rotary workpiece support, means for driving said second workpiece support at the same speed as said templet but in the opposite direction, the axes of said templet and workpiece supports being parallel, three arms swingable about axes parallel to the axes of said templet and workpiece supports and comprising a tracer arm swingable toward and away from said templet, a tracer carried by said tracer arm and adapted to engage and follow the contour of said templet as the latter rotates and thereby swing said tracer arm, a first tool arm swingable toward and away from said first workpiece support, a cutting tool carried by said first tool arm, the relation of said first tool arm and tool to a workpiece held by said first workpiece support being the same as that of the tracer arm and tracer to said templet, a second tool arm swingable toward and away from said second workpiece support, a tool carried by said second tool arm, the relation of said second tool arm and tool to a workpiece held by said second workpiece support being reversely symmetrical to that of said first tool arm and tool to a workpiece held by said first workpiece support, the respective tool arms and tools being a mirror image of one another with respect to a plane of symmetry passing between the two workpiece supports, motion transmitting means interconnecting said tracer arm and first tool arm to impart to said first tool arm a swinging movement proportional to and in the same direction as that of said tracer arm and motion transmitting means interconnecting said first tool arm and said second tool arm to impart to said second tool arm a swinging movement equal to that of the first tool arm but in the opposite direction, one tool arm being swung clockwise when the other is swung counterclockwise.

3. A copying machine according to claim 2, in which the motion transmitting means interconnecting said tool arms comprises a reciprocable carriage guided for rectilinear movement in the direction of the plane of symmetry of the tool arms and links pivotally connected to said carriage and pivotally connected respectively to said tool arms at equal distances from the respective axes of said tool arms, said links being a mirror image of each other with respect to said plane of symmetry.

References Cited in the file of this patent

UNITED STATES PATENTS

| | | |
|---|---|---|
| 1,277,203 | Ensign | Aug. 27, 1918 |
| 1,407,727 | Buck | Feb. 28, 1922 |
| 1,514,448 | Eaglesfield | Nov. 4, 1924 |
| 1,724,981 | Topham | Aug. 20, 1929 |
| 1,753,391 | Topham | Apr. 8, 1930 |
| 1,946,253 | Winkle | Feb. 6, 1934 |
| 2,146,202 | Davenport | Feb. 7, 1939 |